United States Patent [19]

Bain

[11] Patent Number: 4,521,786
[45] Date of Patent: Jun. 4, 1985

[54] PROGRAMMABLE DRIVER/CONTROLLER FOR INK JET PRINTHEADS

[75] Inventor: Lee L. Bain, Arlington, Tex.

[73] Assignee: Xerox Corporation, Stamford, Conn.

[21] Appl. No.: 422,404

[22] Filed: Sep. 20, 1982

[51] Int. Cl.³ .................... G01D 15/18; H01L 41/10
[52] U.S. Cl. .................... 346/140 R; 310/317
[58] Field of Search .................... 310/316, 317; 346/140 R, 1.1, 136; 84/DIG. 24

[56] References Cited

U.S. PATENT DOCUMENTS

| | | | |
|---|---|---|---|
| 3,902,083 | 8/1975 | Zoltan | 310/317 |
| 4,126,867 | 11/1978 | Stevenson, Jr. | 310/317 |
| 4,184,168 | 1/1980 | Isayama et al. | 346/140 R |
| 4,216,483 | 8/1980 | Kyser et al. | 346/140 R |
| 4,245,224 | 1/1981 | Isayama et al. | 346/140 R |
| 4,266,232 | 5/1981 | Juliana, Jr. et al. | 346/140 R |
| 4,282,535 | 8/1981 | Kern et al. | 310/317 |
| 4,284,996 | 8/1981 | Greve | 346/1.1 |
| 4,300,144 | 11/1981 | Isayama et al. | 346/140 R |
| 4,398,204 | 8/1983 | Dietrich et al. | 346/140 |

Primary Examiner—E. A. Goldberg
Assistant Examiner—Gerald E. Preston
Attorney, Agent, or Firm—Richard A. Tomlin

[57] ABSTRACT

A drive circuit for a drop-on-demand ink jet ejector. Both drive pulse amplitude and drive pulse width are programmably controlled by utilizing simple digital circuitry.

2 Claims, 6 Drawing Figures

PROGRAMMABLE DRIVER/CONTROLLER FOR INK JET PRINTHEADS

This invention relates to an improved drive circuit for a drop-on-demand ink jet.

Drop-on-demand ink ejectors are well known in the art, commercial units being available. Drop-on-demand ink jet printers eject droplets only when a mark is required by the image to be formed. Conventionally, ink is contained in a chamber, the chamber including inlet means to supply ink and an exit orifice through which ink droplets are expelled. The ink is held in the chamber by utilizing an orifice small enough for the surface tension of the ink to prevent the ink from running out. One wall of the chamber is provided with a flexible membrane, which is in contact with the ink. An electromechanical transducer is bonded to the free surface of the flexible membrane in such a manner that when the transducer is "fired" by an electrical drive pulse, it bends the membrane causing the membrane to compress the ink in the chamber sufficiently to eject an ink droplet.

In practice these electromechanical transducer-driven ink ejectors are operated at very high rates, 10,000 to 15,000 droplets per second not being unusual. A typical drive circuit for an ink ejector is shown in U.S. Pat. No. 4,216,483, issued Aug. 4, 1980.

The print quality of drop-on-demand ink jet printing depends on the precise control of dot placement and dot density. For drop-on-demand ink ejectors, dot placement is affected by the velocity of droplet ejection, assuming that the printhead is moving in relation to the record-receiving surface. Dot density, i.e., how dense a mark is made on the record-receiving surface, depends on droplet volume. Both the velocity with which droplets are expelled and the volume of ink contained in the droplet depend on the amplitude and the width of the drive pulse. The control print quality accordingly, it is necessary to control both the drive pulse amplitude and drive pulse width.

For an array of ink jet ejectors, it is necessary that each jet in the array produce similar droplet velocity and volume. By providing drive pulse control for each jet, array performance can be made more uniform. That is, the drive pulse can be tailored to eliminate jet-to-jet operational variation. Ideally, the drive pulse parameters and therefore the drop velocity/volume should be programmable, i.e., adjustable, via the printing system's controlling hardware/software. This ability would not only simplify the static adjustments described above but, more importantly, would enable some degree of dynamic control of the ejector's operation such that their performance might be extended, e.g., stored and/or sensed data could be used to compensate for frequency-dependent and/or crosstalk-dependent drop velocity/volume. More ideally, pulse amplitude as well as pulse width should be individually programmable for each ejector in an array. Clearly, this ability would greatly extend the degree of dynamic control. Whereas pulse width is simple to control programmably, pulse amplitude is relatively more difficult; classically, DAC's (digital-to-analog converters) and linear amplifier drivers are required. For the case of controlling an ink jet array of several nozzles, a DAC and linear amplifier are needed for each nozzle; a relatively expensive implementation.

The invention as claimed is intended to provide a drive circuit that can programmably control in an inexpensive manner both the drive pulse amplitude and width. This is accomplished primarily by using the inherent capacitance of the ejector's electromechanical transducer to store a voltage level determined by the width of a charging control pulse. By terminating the activation of charging circuit (source) at a preselected time during the charging curve (a rise time), the drive pulse amplitude can be set. Further, the width of the drive pulse is terminated by activating a discharge circuit (sink) at a predetermined time. This scheme allows the pulse amplitude as well as pulse width to be controlled as a function of time.

These advantages and others will become apparent upon consideration of the disclosure and particularly when taken in conjunction with the accompanying drawing wherein.

Figure 1:
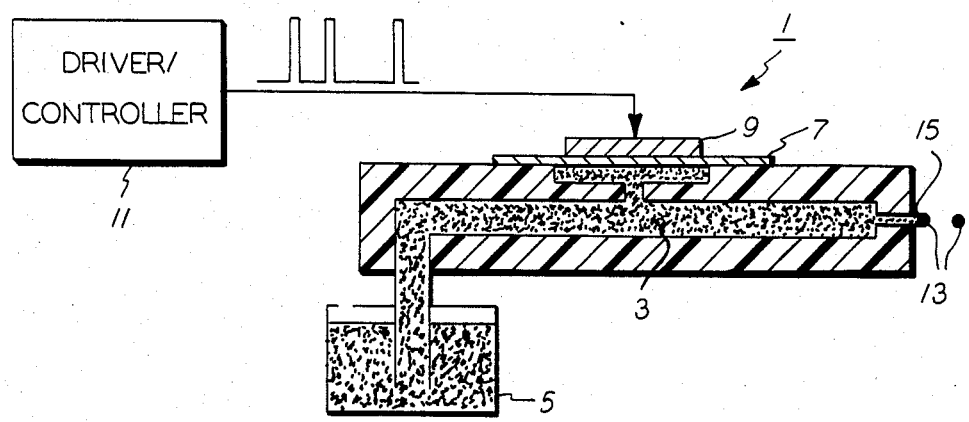
FIG. 1 is a schematic representation in partial cross section of a drop-on-demand ink jet ejector.

Referring now to FIG. 1, there is seen a simplified ink jet ejector 1, which comprises an ink chamber 3; an ink supply 5 connected to ink chamber 3; a flexible membrane 7 sealing one wall of ink chamber 3; an electromechanical transducer 9 bonded to flexible membrane 7; and drive pulse control means, driver/controller 11, for the electromechanical transducer 9, which controller 11 includes the drive circuit of the present invention.

In operation ink chamber 3 is continuously filled with ink supplied, e.g., by capillary action from ink supply 5. A drive pulse from controller 11 causes electromechanical transducer 9, acting against flexible membrane 7, to reduce the volume capacity of the ink chamber 3, thereby expelling a droplet 13 of ink from orifice 15. Typically, a number of such ejectors are combined into an array, each ejector having its own drive pulse, from controller 11. In U.S. Pat. No. 4,126,483, a seven-ejector array is disclosed. Much larger arrays can be provided if desired. Each jet in these arrays operates similarly to that disclosed above.

Figure 2:
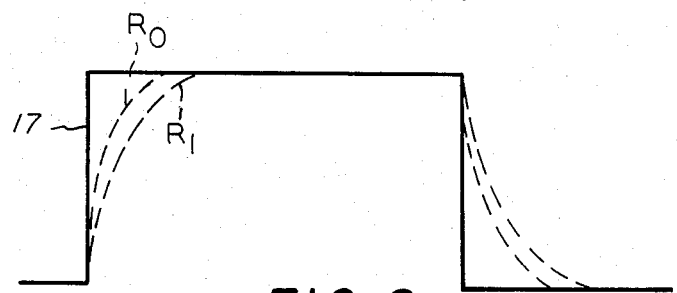
FIG. 2 is a diagram showing how the charging time response "rise time" of an electromechanical transducer is affected by the insertion of a resistor in the charging circuit.

Referring now to FIG. 2, there is shown a diagram of voltage versus time for electromechanical transducer 9 of this invention. Line 17 represents the instantaneous or theoretical application of potential from source of charging potential 31 (see FIG. 3A) by the activation of the source driver 33 to the electromechanical transducer 9. Since electromechanical transducer 9 has a certain capacitance, and the source driver 33 has a certain resistance, the potential difference rise time across electromechanical transducer 9 can be represented by curve $R_o$. A resistor 19 (see FIG. 3A) can be added where desired to further increase the rise time, which can be represented by curve $R_1$. The purpose of flattening the rise time will become apparent.

Figures 3A, 3B:
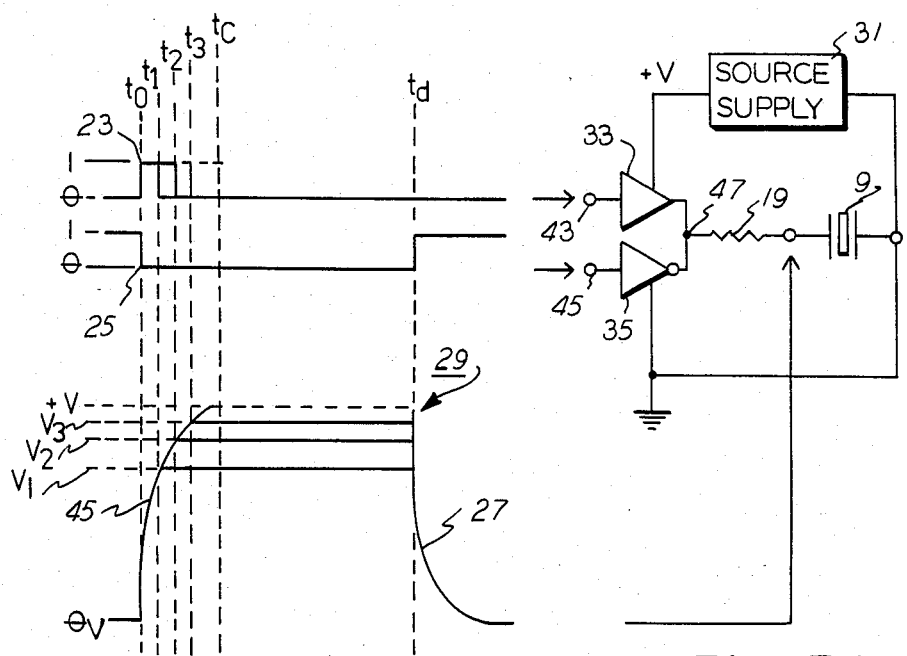
FIG. 3A is a circuit diagram for the driver circuit of this invention.
FIG. 3B is a diagram showing the time relationship between the various control pulses and the resultant drive pulse of this invention for different charging times.

FIG. 3A shows a circuit diagram for the drive circuit 21 of this invention. FIG. 3B shows plots of voltage versus time shown for the FIG. 3A electromechanical transducer 9, charge control pulse 23 and discharge control signal 25. Charge control pulse 23 is fed to input terminal 43 of charging source driver device 33. Discharge control signal 25 is fed to input terminal 45 of inverting discharge sink driver device 35. A source of charging potential 31 is provided as shown. The outputs of both the source 33 and sink 35 driver devices are connected to a common terminal 47, which is at a high impedance when both the source 33 and sink 35 are deactivated, i.e., input terminals 43 and 45 are both at logic level "0". The common output terminal 47 is a low impedance to the +V potential of the source supply 31 when the charge control pulse 23 is at a logic level "1"; likewise, terminal 47 is at a low impedance to the common (ground) side of the circuit when the discharge control signal 25 is at logic level "1". A charging/discharging resistor 19 is provided where desired to increase the rise and discharge times of electromechanical transducer 9. The plot of voltage versus time shows the relationship between the charge control pulse 23, the discharge control pulse 25 and the electromechanical transducer 9 drive pulse 29.

In operation the discharge control signal 25 is maintained at a logic "1" so that sink driver 35 holds the transducer 9 discharged to zero potential except for the duration of the charge drive pulse 23. For the period of the drive pulse 23, the discharge signal 25 is gated to a logic level "0" so that the sink driver 35 is turned off to allow the output terminal 47 to be pulled toward the source potential +V by the source driver 27 when it is activated by the charge control pulse 23 applied to its input terminal 43.

The drive pulse 23 amplitude control provided by this invention can be understood by reference to FIG. 3B. Prior to time $t_o$, the state of control signals 23 and 25 applied to sink and source devices 35 and 33, respectively, causes the potential difference across electromechanical transducer 9 to be held at zero volts. At time $t_0$, the state of both control signals 23 and 25 is reversed causing the voltage potential across the transducer 9 to rise toward +V as its capacitance is charged via the low impedance of the activated source driver 33. If source driver 33 remains activated long enough, the capacitance would charge to the full potential +V at time $t_c$. However, if the charge control pulse 23 is terminated at some time less than $t_c$, then the charging of transducer 9 capacitance stops at a potential v less than +V; for example, if the charge pulse 23 terminates at time $t_2$, then the potential will rise to level $v_2$. The amplitude v is maintained by the capacitance of the electromechanical transducer 9 because both the sink and source drivers 35 and 33 are now in a high impedance state until the discharge control signal 25 rises at time $t_d$ to activate discharge driver 35 to a low impedance state allowing the discharge of electromechanical transducer 9 to ground. The transducer drive pulse 29 has a rise time curve represented by line segment 45, an amplitude v, a width $t_o$-$t_d$ and a discharge curve represented by line segment 27.

Where a larger amplitude v is required, it is necessary only to increase the time that the charge control pulse 23 remains on. For example, assume the charge control pulse 23 remains on for the time period $t_o$-$t_3$. Here the electromechanical transducer 9 would be charged to potential difference $v_3$. Conversely, termination of charging pulse 23 at time $t_1$ decreases the amplitude of transducer drive pulse 29 to the potential $v_1$. Changing the drive pulse 23 width is also simply a matter of varying the period of time $t_0$-$t_d$ to discharge control signal 25.

It can be seen that the amplitude and the width of the transducer drive pulse 29 can be independently controlled using simple switching transistor devices, not linear amplifiers. This invention offers a method for driving drop-on-demand ink ejectors that is digitally programmable and cost-effective. The control method takes advantage of the fact that a drop-on demand ink jet ejector's electromechanical transducer 9 is a highly capacitive load to its driver. Although the electromechanical transducer 9 is a DC device having a resistance, e.g., of about 300 megohms, virtually all the power required to drive it goes into charging and discharging its inherent strong capacitance, e.g., about 4000 picofarads. The method of this invention allows the pulse amplitude and the pulse width to be controlled as a function of time, time being one of the simplest functions for digital circuits, rather than using expensive and power-consuming digital-to-analog converters. The two time-based control pulses 23, 25 may be generated by simple counter logic that is loadable from a control processor.

As an example, the drive pulse rise time 45 (0-100%) may be up to 10 microseconds for normal ejector performance. Also, typically, the maximum drive pulse amplitude required for a given printhead might be 75 volts. By setting +V to 80 volts and selecting an appropriate resistor valve 19, the rise time 45 can be adjusted such that v is 75 volts at 10 microseconds. The adjustable amplitude range would then fall between approximately 2 and 10 microseconds. If this 8 microsecond range is divided into 16 segments of 0.5 microseconds each, then a four-bit counter driven by a two-megahertz clock would be sufficient for 16 amplitude levels. Of course, additional counter stages may be added if more than 16 levels are required to provide greater resolution. If the source driver 33 is a constant current device, then a direct amplitude-to-time relationship exists. This is not necessary, however, since non-linear conversion can readily be provided by system control processor 101 (see FIGS. 4 and 5).

Figure 4:
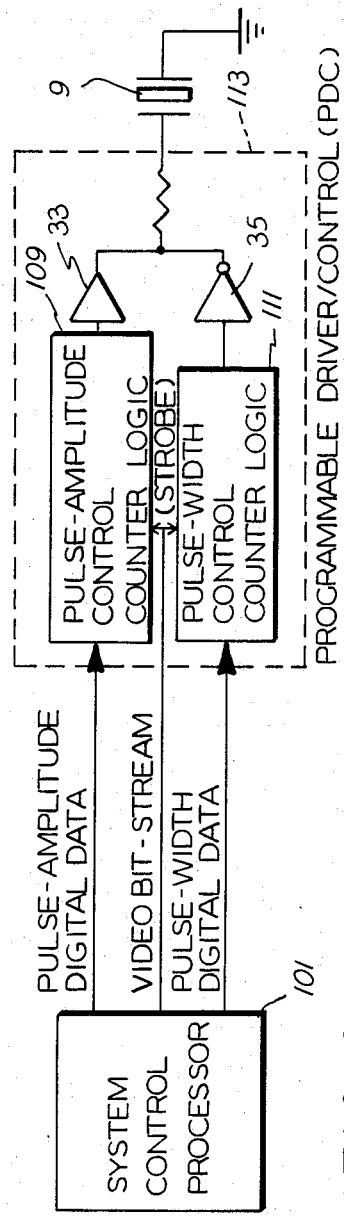
FIGS. 4 and 5 show schematic diagrams of a system incorporating the ink jet ejector control of the present invention.
Figure 5:
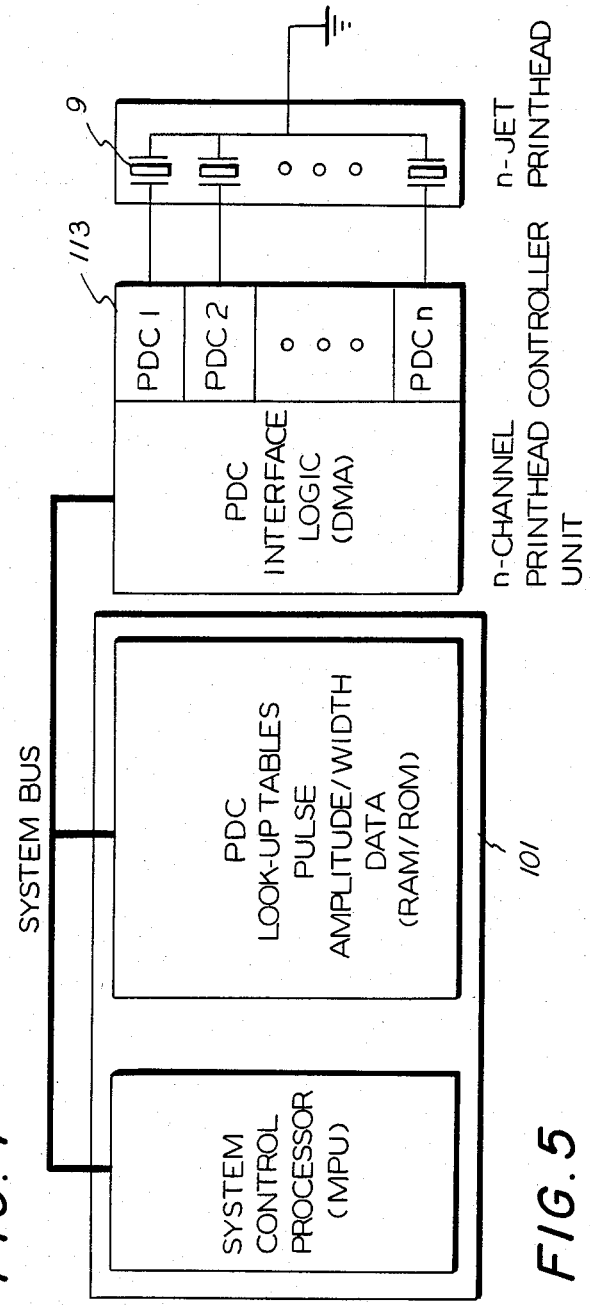

FIGS. 4 and 5 show a schematic diagram of a system incorporating the ink jet ejector control of the present invention. A system process controller 101 provides, in addition to video data, amplitude and width data to the amplitude control counter logic 109 and width control logic 111 as shown in FIG. 4. The system control processor 101 contains the look-up tables necessary to provide the desired amplitude and width data to provide the drive pulse 23 necessary to provide the desired drop ejection velocity and droplet size. The look-up table data could also compensate for certain operating conditions, e.g., jet-to-jet crosstalk compensation or frequency-dependent compensation. The look-up table values may be derived from previously measured "printhead characterization" data. The stored look-up table data could be modified periodically by feedback from drop velocity and/or drop position and/or drop density sensors such that a closed-loop printhead controller could be effected.

In an example, an electromechanical transducer 9, available from Vernitron Piezoelectric Division, Bedford, Ohio as piezoceramic PZT-5H, was driven by charging/discharging source/sink driver devices, available commercially as UDN-2983A/ULN-2823A from Sprague Electric Company, Worcester, Mass. The UDN-2983A integrated circuit device contains eight high-voltage source driver circuits. The ULN-2823A device contains eight high-voltage sink driver transistor circuits. They are conveniently utilized in pairs to drive eight ink jet ejectors 1.

The drop-on-demand ink jet driver control of this invention, in addition to being fully programmable, operates in a mode that enables a cost-effective implementation. The circuits use inexpensive, readily available MSI components. A single VLSI chip could be designed to drive a large array of ejectors.

Although specific embodiments and concepts have been set out in the above description of preferred embodiments, it will be understood that the invention is entitled to the protection within the scope of the appended claims.

What is claimed is:

1. A method of controlling a drop-on-demand ink jet ejector which utilizes an electromechanical transducer to eject droplets in response to a drive pulse which includes the steps of:

(a) providing a supply source of charging potential;

(b) providing charging control means for connecting said supply source of charging potential to said electromechanical transducer, the electromechanical transducer drive pulse having a charging rise time curve due to the capacitance of the electromechanical transducer and the resistance of the charging control means;

(c) applying a charging control pulse to said control means to initiate charging said electromechanical transducer; and (d) terminating said charging control pulse to said control means during the drive pulse charging rise time so that the amplitude of the potential to which the electromechanical transducer is charged is a function of the width of said charging control pulse, and wherein said charging control pulse width is digitally programmable.

2. An electromechanical transducer drive means for connecting a supply source of charging potential to the electromechanical transducer, which includes charging control means for charging the electromechanical transducer, said charging control means including means for digitally programmably controlling the amplitude of the potential to which the electromechanical transducer is charged.

* * * * *